United States Patent [19]
Berman

[11] 3,880,168
[45] Apr. 29, 1975

[54] ENDOTRACHEAL TUBE
[76] Inventor: Robert A. Berman, 501 Cedar Hill Rd., Far Rockaway, N.Y. 11735
[22] Filed: Dec. 21, 1973
[21] Appl. No.: 427,036

[52] U.S. Cl.................................. 128/351; 128/245
[51] Int. Cl............................................ A61m 25/00
[58] Field of Search ........... 128/348, 349, 350, 351,
    128/145.5, 147, 184, 188, 199, 200, 201,
    208, 220, 222, 239, 240, 224, 225, 226, 227,
    228, 229, 230, 231, 241, 242, 251, 276, 248,
    343, 344–347, 245, 246

[56] References Cited
UNITED STATES PATENTS
| 85,995 | 1/1869 | Buffon | 128/245 |
| 868,450 | 10/1907 | Kistler | 128/246 |
| 3,057,347 | 10/1962 | McGee | 128/351 |
| 3,538,918 | 11/1970 | Engelsher | 128/351 |
| 3,638,655 | 2/1972 | Doherty | 128/351 |

Primary Examiner—Richard A. Gaudet
Assistant Examiner—Rick Opitz
Attorney, Agent, or Firm—Stoll and Stoll

[57] ABSTRACT

An endotracheal tube adapted to be easily inserted into one bronchus without obstructing fluid flow from the other bronchus, comprising a tapered distal section for ease of insertion and a multiplicity of openings in the wall of the tapered section to permit full fluid flow therethrough without the reduced flow other wise imposed by the constriction in the tube due to the tapered end. A tapered tamponading elastomeric balloon is formed about the outside circumference of the tube to splint the vocal chords against movement.

1 Claim, 7 Drawing Figures

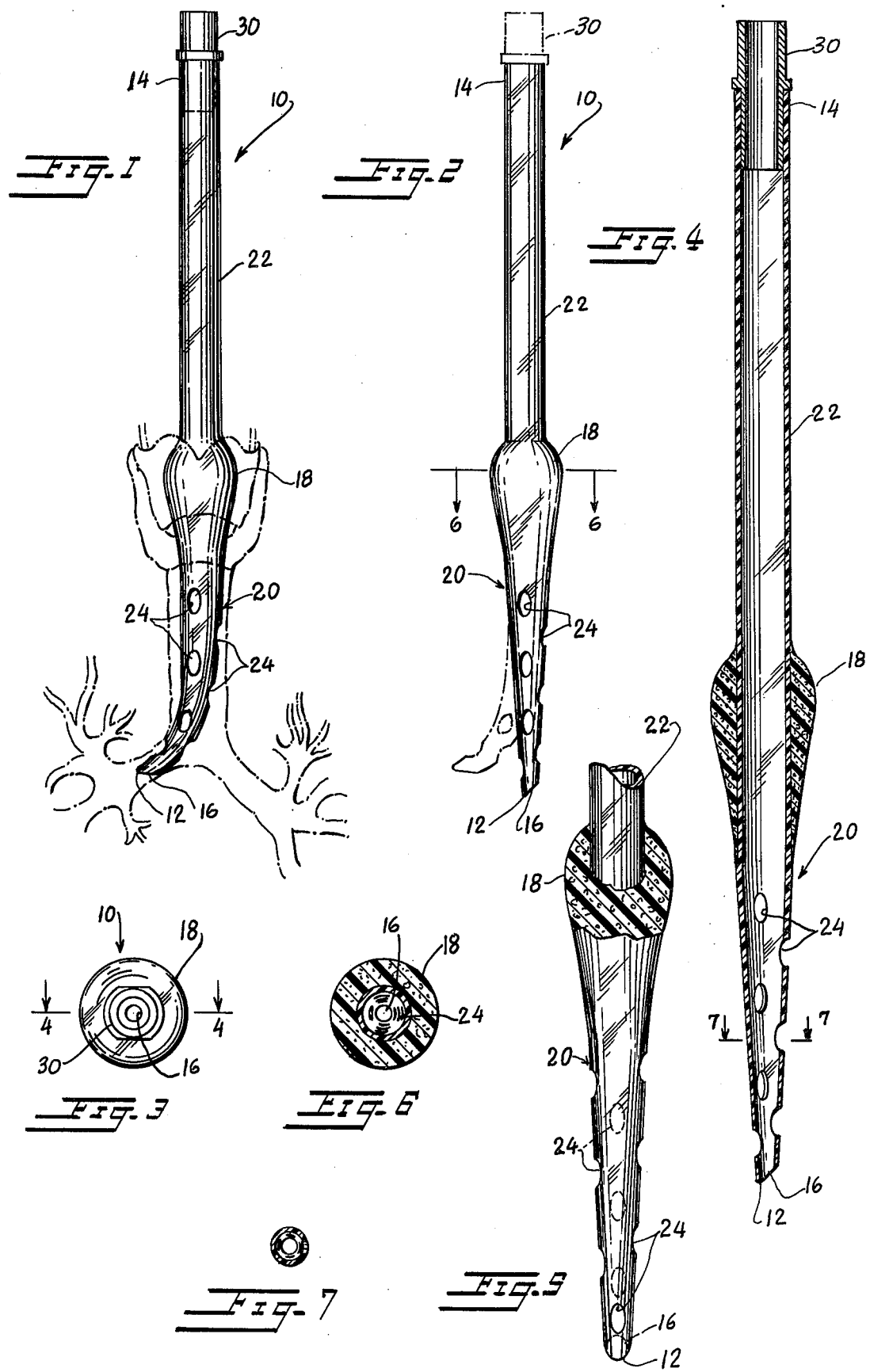

3,880,168

ENDOTRACHEAL TUBE

BACKGROUND OF THE INVENTION

There are many endotracheal tubes available to the practicing anesthesiologist. The following constitutes patent art known to applicant which is related to the subject matter of the present invention:

| | | |
|---|---|---|
| 2,857,915 | | |
| 2,940,126 | | |
| 3,057,347 | A. J. McGee | October 9, 1962 |
| 3,499,435 | P. E. Rockwell et al. | March 10, 1970 |
| 3,538,918 | H. J. Engelsher et al. | November 10, 1970 |
| 3,606,669 | M. S. Kemble | September 21, 1971 |
| 3,640,282 | J. M. Kamen et al. | February 8, 1972 |
| 3,683,908 | Michael et al. | August 15, 1972 |
| 3,754,554 | H. Felbarg | August 28, 1973 |
| Canadian Pat. No. 630,322 | David S. Sheridan | November 7, 1961 |
| Canadian Pat. No. 636,703 | David S. Sheridan | February 20, 1962 |

Notwithstanding that endotracheal tubes have been used for many years and have seen considerable variation and development, it remains that there is no such tube available to the practitioner which combines ease of insertion without rupture of tissue, without restriction of the magnitude of the fluid flow through the largest inside diameter of the tube and while lessening postoperative trauma to the trachea and vocal cords.

SUMMARY OF THE INVENTION

The endotracheal tube of the present invention provides the anesthesiologist with a tube adaptable for use in patients having larynx sizes which range from premature to extremely large. The endotracheal tube of the present invention is particularly valuable for use in children where even the slightest compromise in size causes serious difficulty in ventilation. The tapered tube of the present invention should go a long way in preventing sub-glottic edema yet permit the tube to remain in place for prolonged periods.

Briefly, but not by way of limitation, the present invention provides a tube for endotracheal intubation which is tapered in a direction toward its distal end for ease of insertion, the tapered end being provided with a matrix of holes through the tube wall to increase fluid flow capacity in the tapered end to the fullest extent permitted by the inside diameter of the non-tapered portion of the tube, said non-tapered portion being provided with a tapered elastomeric balloon to splint the vocal chords.

BRIEF DESCRIPTION OF THE DRAWING

FIG. 1 is a frontal view of the endotracheal tube of the present invention shown in position in a trachea, which is illustrated in phantom. It will be noted that the end of the tube near the distal end has a greater curvature than the balance of the tube; this illustrates the greater flexibility of the tube closer to its distal end to accommodate the contour of the trachea and the bronchial tubes. It will also be seen that the multiplicity of holes in the tapered portion of the endotracheal tube is so arranged as to allow an increased flow of fluid through the tube, both from the bronchus into which the distal end is inserted as well as the other bronchus. As shown in the figure, the tapered elastomeric balloon is located at the vocal chords.

FIG. 2 is a frontal view of the endotracheal tube of the present invention similar to that shown in FIG. 1, with the tube portrayed in its normal uncurved configuration with curvature shown in phantom.

FIG. 3 is a bottom or distal end view of the endotracheal tube shown in FIG. 2.

FIG. 4 is a cross-sectional view taken across line 4—4 of FIG. 3 showing the inner construction of the tube.

FIG. 5 is a fragmentary view of the tapered portion of the endotracheal tube showing the tapered elastomeric balloon partially broken away.

FIG. 6 is a cross-sectional view taken across line 6—6 of FIG. 2.

FIG. 7 is a cross-sectional view taken across line 7—7 of FIG. 4.

DESCRIPTION OF A PREFERRED EMBODIMENT

Referring to the drawing, the endotracheal tube 10 of the present invention has a distal end 12 and a near end 14. Distal end 12 is provided with an end opening 16 and has smoothly rounded ends.

A tapered elastomeric balloon 18 is formed about the outer circumference of tube 10 between ends 12 and 14. The balloon, preferably formed of a soft elastomeric material such as "Silastic" a trademark of Dow Corning Corporation for its silicone elastomer, is tapered to a diameter approaching the outer diameter of tube 10 in a direction toward distal end 12.

The portion of tube 10 between tapered elastomeric balloon 18 and distial end 12 is tapered from the full outside diameter of the non-tapered portion 22 of tube 10 between the balloon and near end 14 down, in a direction toward distal end 12, to a diameter suitable for insertion between the vocal chords. Preferred dimensions will be referred to presently. If tapered portion 20 is a continuation of the same tube as nontapered portion 22 with the same wall thickness, a tapering of the outside diameter of the tube will result in a correspondingly tapered inside diameter and, accordingly, a constriction of the inside diameter at distal end 12.

In the preferred embodiment the wall thickness of tapered portion 20 is reduced in a direction toward distal end 12 such that the tube is more flexible toward the distal end than away from the distal end. However, such reduced wall thickness is not sufficient to maintain a uniform inner tube diameter and accordingly the inner diameter of tapered portion 20 itself tapers to a smaller diameter in a direction toward distal end 12.

It goes without saying that a function of an endotracheal tube is to maintain a fluid flow between the bronchial tubes and equipment external of the patient. As used herein, fluid means both liquid and vapor. For example, an endotracheal tube may be used to draw liquids out of the bronchial tubes, or to pump oxygen or anesthesia into the bronchial tubes. Clearly, fluid flow must not be obstructed or the purpose of the endotracheal tube is lost. It is of particular importance that the present invention provides a means for eliminating the reduced fluid flow of the tapered inner diameter necessary for ease of insertion of the endotracheal tube into the trachea.

A matrix of openings is provided in the wall of tapered portion 20 of endotracheal tube 10, the matrix of openings comprising a multiplicity of holes 24 which communicate with the bore 26 of tube 10. Holes 24 provide fluid flow between bore 26 and the bronchial tubes in amounts sufficient to more than overcome the reduced fluid flow through distal end 12 and opening 16 thereof. In the preferred embodiment openings 24 are evenly distributed circumferentially and longitudinally of tapered portion 20 and the total of the cross-sectional areas of holes 24 is greater than the difference between the cross-sectional area of tapered portion 20 at its largest inner diameter and its cross-sectional area at its smallest inner diameter, thereby assuring that fluid will flow at a rate limited by the largest diameter of tapered portion 20, and not the smallest.

The position of the matrix of openings in tapered portion 20 has another exceedingly important function which will be described below.

The endotracheal tube of the present invention is used in a conventional manner. That is, the sterile tube is gently eased into and through the trachea, with rounded narrow distal end 12 being provided for ease of insertion between the vocal chords, even if there is only a small glottic slit to view through the laryngoscope. The rounded end of the tube is designed to slide by the chords and not get caught in the tracheal rings as it is advanced slowly down the trachea.

As the distal end 12 passes the vocal chords, continued insertion of tube 10 for a distance of 3 to 4 inches (7.5 cm to 10 cm) in the normal adult patient will permit tapered portion 20 to slide past the vocal chords, expanding them from a 26F outside diameter to a 45F outside diameter, thus almost doubling its size and virtually quadrupling its cross-sectional area. These dimensions are typical for an endotracheal tube used in the normal adult patient, that is, that the outside circumference of the tube at distal end 12 is 26 mm and the outside circumference at the largest end of tapered portion 20 is 45 mm. The length of tapered portion 20 is approximately 4 inches. In conventional terminology, 26F is the French catheter size which refers to the outside circumference in millimeters.

Additional dimensions in a tube preferred for use in connection with normal adults are the following. The maximum diameter of tapered elastomeric balloon 18 is 20 mm and the maximum outer circumference is 60F. Non-tapered portion 22 of tube 10 has an outer diameter of 15 mm and an outer circumference of 45F.

When tube 10 is fully inserted in the patient's trachea, tapered elastomeric balloon 18 is adjacent the vocal chords and bears radially outwardly against the vocal chords. Because of the extremely soft nature of the balloon, it molds itself between the vocal chords and splints the chords so that they cannot move. Irritation of the vocal chords caused by other movement against conventional endotracheal tubes is considerably reduced and perhaps eliminated entirely. The elimination of tracheal necrosis caused by the inflated cuffs of conventional endotracheal tubes is itself a superior feature of the endotracheal tube of the present invention.

Tapered, elastomeric balloon 18 has the further purpose of sealing the glottic opening and providing an airtight fit with the exterior of endotracheal tube 10.

In its fully inserted position, endotracheal tube 10 gently curves to follow the bronchial contours. Distal end 12 passes into one bronchus and permits fluid flow through the bore of the tube past end opening 16 into and out of that bronchus. At the same time, fluid flow is permitted to and from other bronchus through the matrix of holes in tapered portion 20. Further, fluid flow to and from the first bronchus is not limited to end opening 16, but is augmented by the presence of the holes 24.

The technique which has been used in connection with endotracheal tube 10 is to leave it in place while the bronchoscopist follows the tube through his bronchoscope to the larynx. The tapered portion is then pulled back such that its narrowest section is between the vocal chords, and the bronchoscope is slipped into the larynx. With the tube in this position it may be used for insufflation during bronchoscopy.

The foregoing description may have implied that endotracheal tube 10 has a circular cross-section, and although circular cross-section tubes are preferred for most applications, it is anticipated that a triangular cross-section adapted in shape to fit into the glottic opening will be quite useful.

The endotracheal tube in accordance with the present invention which is small enough to be used in prematures would be ideal for prolonged intubation and continuous positive pressure breathing for treatment in Hyalin membrane disease.

Clinical experience with the endotracheal tube of the present invention has been extensive. Over 100 cases, ranging from a 90 pound female to a 250 pound male, have indicated the unique advantages of the invention.

It will be seen from the drawing that tapered elastomeric balloon 18 is contiguous with the larger diameter end of tapered portion 20 such that the taper of the balloon constitutes in effect a continuation of the taper of the tube, although the rates of taper may vary. It will also be seen from the drawing that the taper of tapered elastomeric balloon 18 is in a direction toward distal end 12 such that the outer diameter of the balloon is reduced in a direction toward the distal end. From its largest outer diameter, in a direction toward near end 14, tapered elastomeric balloon 18 also smoothly tapers to the outer diameter of tube 22.

Shown in the drawing is a conventional adapter 30 which allows connection to standard tubing to medical apparatus. It will be seen from the cross-section in FIG. 4 that the bore of adapter 30 is of a smaller diameter than the bore of endotracheal tube 10. In prior endotracheal tubes this was of no consequence since the limit on fluid flow was determined by the smallest inner diameter of such prior tubes. In connection with endotracheal tube 10 of the present invention, however, the efficacy of the multiplicity of holes in the tapered portion is such that the limit on fluid flow is now determined by the diameter of the bore of adapter 30. This being a standard coupling which is necessary to connect endotracheal tubes to presently existing apparatus, it may be said that the present invention has developed fluid flow through endotracheal tubes to an optimum, further advances in the ability of the tube to pass fluid will be virtually moot inasmuch as the bore of adapter 30 will constitute the upper limit of fluid flow.

While the foregoing is illustrative of the preferred embodiment of the invention it is clear that other embodiments may be had within the teachings hereof.

What is claimed is:

1. An endotracheal tube having a distal end and a near end, comprising:
   a. a tapered portion, said tapered portion extending from a larger outside diameter between the distal and near ends to a smaller outer diameter at the distal end, b. a plurality of holes formed in the wall of the endotracheal tube within said tapered portion,
c. said plurality of holes containing a total cross-sectional area which is greater than the difference between the cross-sectional area of the bore of the tube at its largest inner diameter and the cross-sectional area of the bore of the tube at its smallest inner diameter,
d. a tapered elastomeric balloon extending circumferentially about the exterior of the endotracheal tube,
e. said tapered balloon tapering from a larger outer diameter to a smaller outer diameter in a direction toward said distal end of the tube,
f. the taper of said tapered balloon being a continuation of the taper of said tapered portion of the tube,
g. the thickness of the wall of said tube decreases on said tapered portion toward said distal end, thereby making said tubing progressively more flexible in a direction toward said distal end,
h. said tapered resilient balloon engaging against and splinting a patient's vocal cords to prevent movement of said vocal cords relative to said tapered resilient balloon.

* * * * *